Figure 1:
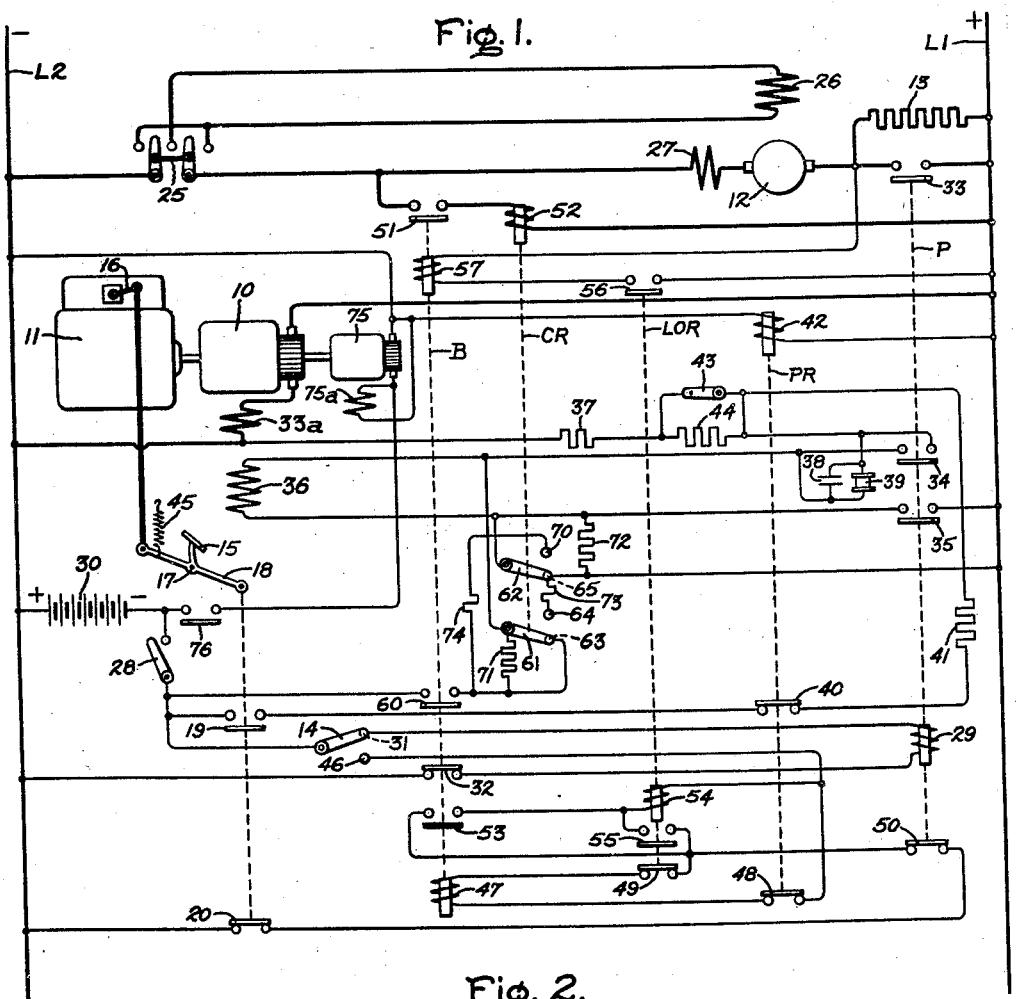

Inventors:
Jacob W. McNairy,
Otto A. Keep,
by Harry E. Dunham
Their Attorney.

Patented Feb. 3, 1942

2,271,984

UNITED STATES PATENT OFFICE 2,271,984

CONTROL SYSTEM

Jacob W. McNairy, Bridgeport, Conn., and Otto A. Keep, Harborcreek, Pa., assignors to General Electric Company, a corporation of New York Application March 15, 1941, Serial No. 383,566

14 Claims. (Cl. 172—239)

Our invention relates to control systems and particularly to dynamic braking control systems for electric vehicles such as locomotives, buses and the like.

In United States Patent 2,213,089 to O. A. Keep and J. C. Aydelotte, dated August 27, 1940, there is disclosed a dynamic braking system for an internal combustion driven electric vehicle in which braking is obtained by connecting a resistor across the motor armature and energizing the motor field with power available from the main generator when the engine is idling. In this type of system it has been found desirable that the main generator voltage be at the relatively low idling speed voltage during braking operation in order to keep the braking effort below a predetermined maximum value. This may be assured by delaying the establishment of dynamic braking connections until the main generator has assumed its idling speed.

It is an object of our invention to provide means permitting an immediate transfer from power to braking connections in an electric vehicle control system of the type described.

It is a further object of our invention to provide a dynamic braking system for an electric vehicle arranged to exert a substantially constant braking effort over a wide range of vehicle speeds.

More specifically an object of our invention is to provide, in such an electric vehicle control system, means for controlling the voltage of the main generator in a manner permitting immediate transfer of connections from power to dynamic braking, thereby obviating the necessity of delaying the establishment of braking until after the main generator has assumed its idling speed.

In accordance with the invention the vehicle is controlled by an accelerator pedal for acceleration and motoring of the vehicle, and dynamic braking is applied by movement of the pedal to its idling position and movement of a manually or automatically operated braking switch to its braking position. It will be understood of course that, if preferred, the braking switch may be arranged for automatic operation to its braking position upon movement of the accelerator pedal to its idling position. Such an arrangement may be made to provide a light dynamic braking load comparable to the drag of the engine in a purely mechanical vehicle power plant. If a separate braking pedal is provided for manual control of the braking rate, the braking switch may be arranged to establish dynamic braking connections upon initial movement of the braking pedal. Dynamic braking is obtained by connecting a resistor across the motor armature and energizing the motor field with power available from the generator when the engine is idling. We also provide means for automatically controlling the motor field so as to obtain a uniform dynamic braking effort over a wide range of generator and vehicle speeds. Control of the energization of the motor field is carried out by a generator field regulating circuit which includes means for reversing the energization of the generator field when necessary.

Among the advantages of our invention is its ability to put reverse excitation on the generator field without opening the field circuit. Such reverse field excitation is frequently desirable upon a quick transfer from power to braking connections before the generator has assumed its idling speed.

Figure 2:
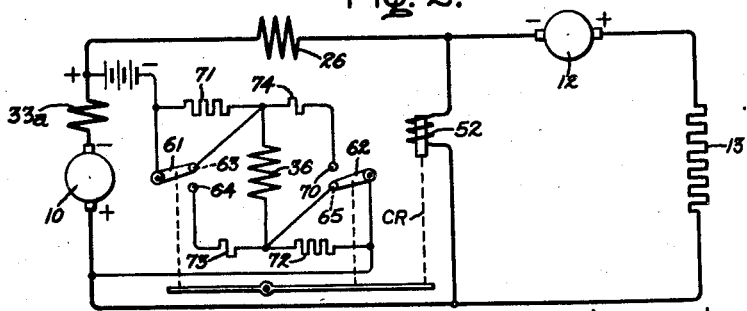

For a more complete understanding of our invention reference should be had to the following specification taken in connection with the accompanying drawing in which Fig. 1 is a diagrammatic representation of a control system for a Diesel-electric bus embodying our invention, and Fig. 2 is a simplified circuit diagram of the dynamic braking connections.

Referring now to the drawing, and particularly to Fig. 1, the invention is disclosed in one form in connection with a prime mover driven electric generator drive for a bus. The generator 10 is driven by a prime mover, shown as a Diesel engine 11, and develops unidirectional electric power for the direct current driving motor 12. For dynamic braking operation the motor 12 is connected across a resistor 13. By way of example we have shown one form of control means comprising a manually operated braking switch 14 and a pedal 15 attached to the Diesel engine throttle 16. As shown the pedal 15 is pivoted at a point 17 and operates a lever 18, one end of which is connected to the throttle 16 and the other end of which is connected to a pair of switches 19 and 20. A manually operated reversing switch 25 is provided for reversing the connections of the traction motor series field 26 for forward or reverse operation of the vehicle. The motor is also provided with a commutating field 27.

Preferably the engine 11 is started with the reversing switch 25 in its neutral or open circuit position as shown. With the engine idling, the reversing switch 25 is thrown to the forward or reverse position as desired. In order to set the vehicle into operation, a master control switch 28 must first be closed. Closure of the control switch 28 completes an energizing circuit for an operating coil 29 of a contactor P. This energizing circuit may be traced from the negative side of a battery 30, through the control switch 28, a normally closed contact 31 of the braking switch 14, the operating coil 29 and a normally closed interlock contact 32 of the braking contactor B to the positive side of the battery 30. When the contactor P picks up it closes a switch 33 to connect the motor 12 directly to the generator 10 through the generator series field 33a. The contactor P also closes a pair of switches 34 and 35 which connect a generator shunt field 36 across the mains L1 and L2 in series with a resistor 37. At idling speed the generator voltage does not build up sufficiently to start the vehicle. For the purpose of preventing arcing from high voltages, such as momentary induced voltages occurring upon the opening of the shunt field circuit, a condenser 38 and a non-linear resistance 39 are connected across the contacts of the switch 34 of the contactor P. The non-linear resistance 39 is of the type permitting a great increase in current upon an increase in voltage applied to it. Preferably it is of the type comprising silicon carbide crystals held together by a suitable binder such as described and claimed in United States Patent 1,822,742—Carl B. McEachron, dated September 8, 1931.

With the engine idling and the contactor P picked up, the pedal 15 may be depressed to set the vehicle in motion. The first movement of the pedal opens the normally closed switch 20. Further movement of the pedal closes the normally open switch 19. Closure of the switch 19 completes a generator shunt field teasing circuit from the battery 30 by connecting the battery 30 across the resistor 37. This circuit may be followed from the negative side of the battery 30 through the control switch 28, the switch 19, a pair of normally closed interlock contacts 40 of a potential relay PR, a resistor 41, the switch 34 of the contactor P, the generator shunt field 36, the switch 35 of the contactor P, and the armature and series field of the generator 10 to the positive side of the battery 30. The opening of the switch 20 prevents the establishment of the dynamic braking circuits which will be described hereinafter.

The generator voltage will now build up in the same direction as the voltage of the battery 30 and will therefore assist the battery in energizing the shunt field 36. When the generator voltage has built up to a predetermined value and operating coil 42 of the potential relay PR is energized sufficiently to pick up its armature and open its interlock contacts 40. The opening of the contacts 40 disables the generator shunt field teasing circuit previously traced. The main generator 10 is now self-excited through a field circuit which may be traced from the main L1, through the switch 35 of the contactor P, the shunt field 36, the switch 34 of the contactor P, a manually operable switch 43 shunting a field resistor 44, and the resistor 37 to the main L2.

From this point on the rate of acceleration and the ultimate speed are entirely under the control of the throttle opening of the engine, i. e. under the control of the pedal 15, the operation being similar to the conventional mechanical drive. For low speed operation the manually operated switch 43 may be opened to insert the resistance 44 into the circuit of the generator shunt field.

*Braking operation*

Dynamic braking is established by releasing the pedal 15 and throwing the braking switch 14 to its braking position. It will be understood of course that, if preferred, the switch 14 may be automatically operated or may be operated by the accelerator pedal 15 or a separate brake pedal. When the pedal 15 is released it will return to its biased idling position under the control of a biasing spring 45, and will thereby open the switch 19 and close the switch 20. In the braking position of the manually operable switch 14 the contact 31 of the switch 14 is open and a contact 46 is closed.

Opening of the contact 31 of the switch 14 disables the energizing circuit for the operating coil 29 of the contactor P. At the same time the closing of the contact 46 of the switch 14 completes an energizing circuit for a pickup coil 47 of the braking contactor B. This energizing circuit may be traced from the negative side of the battery 30 through the control switch 28, the contact 46 of the switch 14, a normally closed interlock contact 48 of the potential relay PR, the operating coil 47 of the braking contactor B, a normally closed interlock contact 49 of a lockout relay LOR, and a normally closed interlock contact 50 of the contactor P to the positive side of the battery 30. When the contactor P drops out it opens its switch 33 to connect the resistor 13 in circuit with the armature of the motor 12. It also opens its switches 34 and 35 to disconnect the generator shunt field 36 from the mains L1 and L2. With the shunt field disconnected the generator voltage falls sufficiently to permit the potential relay PR to drop out. When the braking contactor B picks up it closes a switch 51 to complete an energizing circuit for a current responsive operating coil 52 of a control relay CR. Upon picking up, the contactor B also closes an interlock contact 53 to complete an energizing circuit for an operating coil 54 of the lockout relay LOR. This energizing circuit may be traced from the negative side of the battery 30, through the control switch 28, the contact 46 of the braking switch 14, the operating coil 54, the interlock contact 53 of the contactor B, the interlock contact 50 of the contactor P, and the switch 20 to the positive side of the battery 30. When the relay LOR picks up it locks itself in around the braking contactor interlock 53 by closing a locking-in circuit through its own interlock contact 55. The lockout relay LOR also opens its interlock contact 49 to disable the energizing circuit for the pick-up coil 47 of the contactor B and closes a contact 56 to complete an energizing circuit for a holding coil 57 of the contactor B. The holding coil 57 is energized by the voltage across the braking resistor 13, and its energizing circuit may be traced from the main L1 through the contact 56 of the relay LOR and the coil 57 to the other side of the resistor 13. Closure of the contactor B also precludes operation of the contactor P by the opening of the interlock contact 32 of the braking contactor B.

The current responsive coil 52 is energized from two sources. It will be apparent from inspection of Fig. 1 that the coil 52 is connected in series with the braking resistor 13 and the armature of the motor 12 and therefore carries the braking current. Likewise the coil 52 is connected directly across the armature and series field of the generator 10 and thus carries the motor field exciting current.

Operation of the braking contactor B also completes a new shunt field circuit for the generator 10. This field circuit includes the battery 30 in series and may be traced from the main L2 through the battery 30, the control switch 28, a switch 60 of the braking contactor B, a movable switch arm 61 of the regulating control relay CR, the generator shunt field 36, and a movable switch arm 62 of the control relay CR to the main L1.

Referring now to the regulating control relay CR, the movable contact arm 61 is normally biased against a stationary contact 63 and in operation may be moved into engagement with a stationary contact 64, while the movable contact arm 62 is normally biased into engagement with a stationary contact 65 and in operation may be moved into engagement with a stationary contact 70. Shunted between the contact arm 61 and the contact 63 and between the contact arm 62 and the contact 65 I have shown similar regulating resistors 71 and 72, respectively. Between the stationary contacts 64 and 65 is a regulating resistor 73; while between the stationary contacts 63 and 70 is a similar regulating resistor 74. The resistors 71 and 72 are of greater resistance than the resistors 73 and 74, preferably having a resistance of the order of five times that of the resistors 73 and 74.

The braking connections of the power circuits and the regulating control relay CR are illustrated at Fig. 2. From an inspection of the polarities indicated at Figs. 1 and 2 it will be observed that when the braking connections are established the generator 10 supplies to the traction motor field winding 26 a direct current of the same polarity as that supplied to this winding during motoring operation. The voltage generated in the armature of the motor 12 will therefore be in the same direction as the back electromotive force developed during motoring operation and will send a current through the armature in a direction opposite to that of the current flowing through the armature during motoring. Referring now particularly to Fig. 2 it will be observed that the voltage of the generator 10 is opposed by the voltage generated in the armature of the motor 12 and that these voltages tend to send additive currents through the current responsive coil 52 of the control relay CR. The coil 52 is common to the braking circuit through the armature of the motor 12 and the excitation circuit through the motor series field winding 26. From Fig. 2 it will also be noted that the generator and battery voltages are additive with respect to the generator shunt field.

In operation, the braking effort is maintained substantially uniform over a wide range of vehicle speeds by means of the current coil 52 of the control relay CR which operates to control the amount of field excitation supplied to the generator field 36. Whenever the braking current exceeds a predetermined value the coil 52 will be energized sufficiently to operate the control relay contact arms 61 and 62. As soon as the contact arms 61 and 62 move away from their respective stationary contacts 63 and 65, the regulating resistors 71 and 72 are inserted in series with the generator shunt field 36. By thus diminishing the excitation of the generator shunt field the generator voltage is caused to drop, thereby diminishing the excitation of the motor field 26 and reducing the dynamic braking effort. The consequent decrease in the current passing through the regulating coil 52 is usually sufficient to cause the contact arms 61 and 62 to reengage the stationary contacts 63 and 65. In this manner the contact arms 61 and 62 will regulate on the contacts 63 and 65 to control the braking effort and maintain it at a substantially constant value. If, however, the speed of the vehicle is high, or if the generator voltage is higher than normal, as due to residual field flux or to a generator speed above the normal idling speed, the braking current will tend to rise and will produce full energization of the regulating coil 52, whereby the contact arms 61 and 62 of the control relay CR will engage their respective stationary contacts 64 and 70. From an inspection of Fig. 2 it will be evident that, when the contacts 64 and 70 are engaged, the shunt field winding is connected in a resistance bridge circuit and has its excitation reversed due to the relation of the voltage drops across the resistors of the bridge. The reversed generator field excitation will so reduce the braking current that the contact arms 61 and 62 will leave the contacts 64 and 70. If, however, the braking current still tends to rise, the arms 61 and 62 will regulate on the contacts 64 and 70 to maintain the braking current substantially constant. It will be understood, of course, that only a very small increase in braking current is required to operate the relay CR from its full generator field position to its field reducing and field reversing positions described above. The relay CR therefore has the effect of preventing excessive braking currents which might otherwise result from either abnormally high field exciting generator voltage or high vehicle speed during braking.

As has already been noted, an abnormally high generator voltage may result from a residual field flux in the generator pole structure when a quick transfer is made from motoring to braking. By its ability to reverse the generator field excitation the control relay CR forming part of our invention is very effective in quickly reducing such residual flux to zero. High generator voltage may also result from an abnormally high generator speed. Although the normal idling speed of the engine 11 is approximately constant, a generator speed during braking operation greater than the normal idling speed of the engine may be due either to an increased setting of the idling speed or to the fact that after a rapid transfer from power to braking the inertia of the generator tends to prevent its speed from falling.

As a result of the action described above the sum of the motor field current and the motor armature current which flows through the coil 52 is maintained substantially constant, and a differential excitation characteristic is obtained for the motor. In other words, as the vehicle speed decreases and the dynamic braking current in the coil 52 decreases the current in the motor field 26 is increased to maintain a predetermined sum value which gives a substantially constant braking effort.

When the vehicle speed falls below a predetermined minimum value, as for example 15 M. P. H., the total current through the coil 52 decreases because the motor field now has its maximum excitation with the contact arms 61 and 62 continuously engaging their respective contacts 63 and 65, and the coil 52 no longer regulates the braking action. The dynamic braking action now decreases and the voltage across the braking resistor 13 decreases. At some predetermined low speed, as for example 6 M. P. H., the voltage across the braking resistor 13 will be insufficient to energize the holding coil 57 of the braking contactor B and the braking contactor will drop out to discontinue the dynamic braking. When the braking contactor B drops out it opens its switch 60 to disable the generator shunt field circuit. Upon drop-out of the contactor B the pick-up coil 47 of the contactor will not be reenergized because the lockout relay LOR remains picked up through its lock-in circuit and holds the energizing circuit for the coil 47 disabled at the contacts 49 of the lock-out relay.

In the event that power is applied by depressing the pedal 15 before the dynamic braking sequence is complete, the lock-out relay LOR will be disabled by the opening of the switch 20. When the lock-out relay drops out it will open its contact 56 to disable the energizing circuit for the holding coil 57 of the braking contactor B.

A generator 75 driven by the prime mover 11 and having a self-excited shunt field 75a is provided for charging the battery 30. This generator is connected to the battery by means of a switch 76 which is suitably operated by means not shown in response to battery and generator voltage and current conditions such as by the control means described and claimed in United States Patent 2,072,783 to H. F Wilson, issued March 2, 1937.

While we have shown a particular embodiment of our invention it will be understood, of course, that we do not wish to be limited thereto since many modifications may be made, and we, therefore, contemplate by the appended claims to cover any such modifications as fall within the true spirit and scope of our invention.

What we claim as new and desire to secure by Letters Patent of the United States is:

1. In a dynamic braking system, a momentum driven dynamo-electric machine having an armature and a series field winding, a braking resistor connected to complete a dynamic braking circuit including said armature, a generator connected to complete an excitation circuit including said series field winding and a common portion of said braking circuit, a field exciting winding for said generator, and means responsive to the sum of the currents in said braking circuit and excitation circuit for reversing the excitation of said field exciting winding.

2. In a dynamo braking system, a direct current momentum, driven dynamo-electric machine having an armature and a series field winding, a braking resistor connected to complete a dynamic braking circuit including said armature, a direct current generator connected to complete an excitation circuit including said series field winding and a common portion of said braking circuit, a shunt field winding connected to said generator, and current responsive regulating means for reversing the excitation of without disconnecting said shunt field winding.

3. In a dynamic braking system, a direct current momentum driven dynamo-electric machine having an armature and a series field winding, a braking resistor connected to complete a dynamic braking circuit including said armature, a direct current generator provided with a shunt field winding and connected to complete an excitation circuit including said series field winding and the common portion of said braking circuit, and means responsive to the sum of the currents in said braking and excitation circuits arranged to reverse the excitation of said shunt field winding through a resistance bridge.

4. In a dynamic braking system, a direct current momentum driven dynamo-electric machine having an armature and a series field winding, a braking resistor connected to complete a dynamic braking circuit including said armature, a direct current generator connected to complete an excitation circuit including said series field winding and a common portion of said braking circuit, a shunt field winding connected to said generator, and regualting means responsive to the sum of the currents in said braking and excitation circuits for reversing the excitation of without disconnecting said shunt field winding.

5. In a dynamic braking system, a direct current traction motor having an armature and a series field winding, a braking resistor connected to complete a dynamic braking circuit including said armature, an approximately constant speed direct current generator having a shunt field winding connected thereto, connections including a common portion of said dynamic braking circuit for connecting said generator to said series field winding to effect dynamic braking of said traction motor, regulating means responsive to the current in said common portion of said dynamic braking circuit for controlling the excitation of said shunt field winding, and means operable in conjunction with said regulating means for reversing the excitation of without disconnecting said shunt field winding.

6. In a dynamic braking system for an electric vehicle, a direct current traction motor having an armature and a series field winding, a braking resistor connected to complete a dynamic braking circuit including said armature, a direct current generator having a shunt field winding connected thereto, means for driving said generator at an approximately constant speed subject to slight variations, connections including a common portion of said braking circuit for connecting said generator to said series field winding to effect dynamic braking of said traction motor, regulating means for controlling the excitation of said shunt field winding including a plurality of resistors and means for shunting said resistors in response to the current in said common portion of said braking circuit, and means operable in conjunction with said shunting means for reversing the excitation of without disconnecting said shunt field winding.

7. In a dynamic braking system for an electric vehicle, a direct current traction motor having an armature and a series field winding, a braking resistor connected to complete a dynamic braking circuit including said armature, a direct current generator provided with a shunt field winding, means for driving said generator at an approximately constant speed subject to slight variations, connections including a common portion of said braking circuit for connecting said generator to said series field winding to effect dynamic braking of said traction motor, regulating means responsive to the current in said common portion of said braking circuit for controlling the excitation of said shunt field winding, said regulating means including a plurality of resistors and means for shunting said resistors, and means operable by said regulating means when said resistors are unshunted to reverse the excitation of said shunt field winding through a resistance bridge circuit.

8. In a dynamic braking system for an electric vehicle, a direct current traction motor having an armature and a series field winding, a braking resistor connected to complete a dynamic braking circuit including said armature, a direct current generator having a shunt field winding, means for driving said generator at an approximately constant speed subject to slight variations, connections including a common portion of said braking circuit for connecting said generator to said series field winding to effect dynamic braking of said traction motor, contact means including movable contacts for connecting said shunt field to said generator, a regulating resistor shunted by each of said contact means, stationary contacts operable in conjunction with said movable contacts to connect said shunt field for reverse excitation through a resistance bridge, and means responsive to the current in said common portion of said braking circuit for operating said movable contacts.

9. In a dynamic braking system for an electric vehicle, a direct current traction motor having an armature and a field winding, a braking resistor connected to complete a dynamic braking circuit including said armature, a direct current generator having a shunt field winding, means for driving said generator at an approximately constant speed subject to slight variations, connections including a common portion of said braking circuit for connecting said generator to said motor field winding to effect dynamic braking of said traction motor, contact means including movable contacts for connecting said shunt field to said generator, a regulating resistor shunted by each of said contact means, stationary contacts operable in conjunction with said movable contacts to connect said shunt field for reverse excitation through a resistance bridge, means responsive to the current in said common portion of said braking circuit for operating said movable contact means, and means responsive to the voltage across said resistor for disabling said braking circuit.

10. In a control system for an electric vehicle, an internal combustion engine, a direct current generator driven by said engine, a shunt field for said generator, a direct current traction motor having an armature and a series field winding, first switching means for connecting said motor directly to said generator and connecting said shunt field across said generator for motoring operation, a manually operable device biased to a low speed position for controlling said engine, a dynamic braking resistor for said traction motor, second switching means operable to complete a dynamic braking circuit including said resistor and said armature and to connect said shunt field winding to said generator for excitation of said series field winding through a circuit including a common portion of said braking circuit, a manually operable means, a switch operated by said manually operable device and effective in the biased low speed position of said device in conjunction with said manually operable means to energize said second switching means, means operable in conjunction with said manually operable means to disable said first switching means, and regulating means responsive to the sum of the currents in said braking and excitation circuits for reversing the excitation of without disconnecting said shunt field winding.

11. In a control system for an electric vehicle, an internal combustion engine, a direct current generator driven by said engine, a shunt field for said generator, a direct current traction motor having an armature and a series field winding, a dynamic braking resistor permanently connected to said armature, first switching means for connecting said motor directly to said generator and connecting said shunt field across said generator for motoring operation, a manually operable device biased to a low speed position for controlling said engine, second switching means operable to complete a dynamic braking circuit including said resistor and armature and to connect said shunt field winding to said generator for excitation of said series field winding through a circuit including a common portion of said braking circuit, a manually operable switch, a switch operated by said manually operable device and effective in the biased low speed position of said device in conjunction with said manually operable switch to energize said second switching means, means operable in conjunction with said manually operable switch to disable said first switching means, and means responsive to the sum of the currents in said braking and excitation circuits for connecting said shunt field winding for reverse excitation through a resistance bridge.

12. In a control system for an electric vehicle, an internal combustion engine, a direct current generator driven by said engine, a shunt field for said generator, a direct current traction motor having an armature and a series field winding, a dynamic braking resistor permanently connected to said armature, first switching means for shunting said resistor to connect said motor directly to said generator and for connecting said shunt field across said generator for motoring operation, a manually operable device biased to a low speed position for controlling said engine, second switching means operable to unshunt said resistor and to complete a dynamic braking circuit including said resistor and said armature and to connect said shunt field winding to said generator for excitation of said series field winding through a circuit including a common portion of said braking circuit, a manually operable switch, a switch operated by said manually operable device and effective in the biased low speed position of said device in conjunction with said manually operable switch to energize said second switching means, means operable in conjunction with said manually operable switch to disable said first switching means, regulating means responsive to the current in said common portion of said braking circuit for controlling the excitation of said shunt field winding, said regulating means including a plurality of resistors and means for shunting said resistors, and means operable by said regulator when said resistors are unshunted for connecting said shunt field winding in a resistance bridge circuit for reverse excitation.

13. In a control system for an electric vehicle, an internal combustion engine, a direct current generator driven by said engine, a shunt field for said generator, a direct current traction motor having an armature and a series field winding, first switching means for connecting said motor directly to said generator and connecting said shunt field winding across said generator for motoring operation, a manually operable device biased to a low speed position for controlling said engine, a dynamic braking resistor for said traction motor, second switching means operable to complete a dynamic braking circuit including said resistor and said armature and to connect said shunt field winding to said generator for excitation of said series field winding through a circuit including a common portion of said braking circuit, a first switch operable in conjunction with said manually operable device to disable said first switching means, a second switch operated by said manually operable device and effective in the biased low speed position of said device in conjunction with said first switch to energize said second switching means, and regulating means responsive to the sum of the currents in said braking and excitation circuits for reversing the excitation of without disconnecting said shunt field winding.

14. In a control system for an electric vehicle, an internal combustion engine, a direct current generator driven by said engine, a shunt field for said generator, a direct current traction motor having an armature and a series field winding, a dynamic braking resistor permanently connected to said armature, first switching means for connecting said motor directly to said generator and connecting said shunt field winding across said generator for motoring operation, a manually operable device biased to a low speed position for controlling said engine, second switching means operable to complete a dynamic braking circuit including said resistor and armature and to connect said shunt field winding to said generator for excitation of said series field winding through a circuit including a common portion of said braking circuit, a first switch operated by said manually operable device and arranged to disable said first switching means when said manually operable device is in said low speed position, a second switch operated by said manually operable device and effective in the biased low speed position of said device in conjunction with said first switch to energize said second switching means, and means responsive to the sum of the currents in said braking and excitation circuits for connecting said shunt field winding for reverse excitation through a resistance bridge.

JACOB W. McNAIRY.
OTTO A. KEEP.